United States Patent
Simonyi et al.

(10) Patent No.: US 12,204,849 B2
(45) Date of Patent: Jan. 21, 2025

(54) GESTURE-DRIVEN PIVOT TABLE CONFIGURATIONS

(71) Applicant: Microsoft Technology Licensing, LLC, Redmond, WA (US)

(72) Inventors: Charles Simonyi, Medina, WA (US); Juan Camilo Osorio Cardona, Vancouver (CA)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 18/045,275

(22) Filed: Oct. 10, 2022

(65) Prior Publication Data

US 2024/0119226 A1  Apr. 11, 2024

(51) Int. Cl.
*G06F 40/18* (2020.01)
*G06F 3/04883* (2022.01)

(52) U.S. Cl.
CPC .......... *G06F 40/18* (2020.01); *G06F 3/04883* (2013.01)

(58) Field of Classification Search
CPC .............................. G06F 40/18; G06F 3/04883
See application file for complete search history.

(56) References Cited

U.S. PATENT DOCUMENTS

| | | | |
|---|---|---|---|
| 2011/0276867 A1* | 11/2011 | Machalek | G06F 40/18 715/212 |
| 2012/0112997 A1* | 5/2012 | Becerra, Sr. | G06F 3/04815 345/156 |
| 2013/0097563 A1 | 4/2013 | Pacheco et al. | |
| 2014/0019842 A1 | 1/2014 | Montagna et al. | |
| 2017/0075874 A1* | 3/2017 | Folting | G06F 40/177 |
| 2023/0289518 A1* | 9/2023 | D | G06F 3/04815 715/214 |

OTHER PUBLICATIONS

International Search Report received for PCT Application No. PCT/US23/031469, Nov. 28, 2023, 12 pages.

* cited by examiner

*Primary Examiner* — Jennifer N Welch
*Assistant Examiner* — Amy P Hoang

(57) ABSTRACT

An enhanced user experience is disclosed herein that provides for gesture-based configuring of pivot tables. In various implementations, a pivot table includes query areas associated with fields of a data table being summarized by the pivot table. Gestures made with respect to an area of the pivot table drive changes in the association of the fields of the data table with the query areas of the pivot table. As user input is received with respect to an area of the pivot table, relevant fields are identified, and new associations are made between the query areas and the fields. The pivot table may then be updated accordingly based on the new associations.

20 Claims, 16 Drawing Sheets

GESTURE-DRIVEN PIVOT TABLE CONFIGURATIONS

TECHNICAL FIELD

Aspects of the disclosure are related to the field of computer software applications and, in particular, to pivot tables and associated technology.

BACKGROUND

A pivot table is a table of values that reduces data in another, larger table in a spreadsheet, a database, or a business intelligence application. In an example reduction, a source table is populated with data arranged in columns and rows. Each row holds a single data record, while each column defines a specific field of the records. A pivot table created to summarize the data in the source table would consist of a smaller number of columns and rows that form cells populated with values produced by filtering and summing the source table.

Each cell in the pivot table holds the result of a unique query to the source table defined by the cell's position in the pivot table. That is, each cell in the pivot table resides at the intersection of a specific column and row of the pivot table. In addition, the columns and rows of the pivot table are labeled with unique values drawn from the source table. Each query therefore arises from the intersection of a specific column-row pair in the pivot table and serves to filter the source table based on the label(s) assign to its column-row pair.

How the columns and rows of the pivot table are labeled—and thus, how the source table is filtered and summarized for each individual query—depends on how the pivot table is configured. A pivot table has at least three components: a columns area, a rows area, and a values area (and sometimes a filter area). A user assigns one or more fields of the source table to each of the pivot table areas, resulting in a mapping of source fields to pivot table areas, which forms the basis for how each query is constructed.

For example, the columns and rows areas of the pivot table are populated with unique values from their corresponding columns in the source table, while the cells in the values area are populated with the sum or count of values their corresponding columns of the source table. The pivot table filters the source table differently for each cell in the values area based on the specific column-row combination for the cell. The values in corresponding field of the filtered source table may then be summed or counted and the result entered into the target cell of the pivot table.

A pivot table's configuration is governed by user input supplied via a configuration menu. The configuration menu may include, for example, a listing of fields from the source data table. A user can drag and drop a given field into a box associated with the areas of the pivot table in order to assign that field to a particular area.

For instance, a user can drag the name of a field from the list into a box associated with the columns area. Unique values from that field in the source table will serve as the column headers for the pivot table. Similarly, a user can drag the name of another field from the list into a different box in the menu associated with the rows area of the pivot table. Unique values from the other field in the source table will serve as the row headers for the pivot table. Lastly, the user can drag and drop the name of yet another field into a box in the configuration menu associated with the values area of the pivot table.

When the pivot table executes, it constructs individual queries for each one of the cells in the values area of the pivot table. Each query is constructed from one or more unique values supplied by the row and column that intersect at a target cell. The source data table is filtered based on the unique value(s) of the query and a sum or count is generated from the filtered data to be displayed in the target cell.

In the aggregate, the query results displayed in each of the cells provides the user with a summary understanding of the source data table. However, to summarize the source table in a different way, the user must enter the configuration menu to manually change the pivot table selections. For instance, the user must remove undesired fields from the boxes associated with the pivot table areas and drop new fields into the areas. Such steps can be confusing to the user and are error prone, leading to mistakes in the results and a frustrating user experience.

Overview

An enhanced user experience is disclosed herein that provides for gesture-based configuring of pivot tables. In various implementations, a pivot table includes query areas associated with fields of a data table being reduced by the pivot table. Gestures made with respect to an area of the pivot table drive changes in the association of the fields of the data table with the query areas of the pivot table. As user input is received with respect to an area of the pivot table, relevant fields are identified, and new associations are made between the query areas and the fields. The pivot table may then be updated accordingly based on the new associations.

In one implementation, a computer-implemented method of operating a spreadsheet application includes generating a pivot table based on one or more fields of a data table. The method continues with receiving user input comprising a gesture made with respect to an area of the pivot table associated with a field of the one or more fields, and identify, based on the gesture, a different field of the data table to associate with the area of the pivot table. The pivot table may be updated based at least on the different field of the data table.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

DETAILED DESCRIPTION

Various implementations disclosed herein provide for gesture-based configuration of pivot tables. Users are able to make gestures with respect to the query areas of a pivot table that causes the configuration of the pivot table to change in response to the gestures. For example, by simply swiping left or right—or zooming in or out—with respect to a query area of a pivot table, the table fields that serve as query generators for the pivot table are changed. One field may be swapped out for another, for example, or the dimension of a query area may change. Such gesture-based control of the pivot table allows users to easily and intuitively explore potential pivot tables without the need for mastering complex configuration menus.

In addition, various technical effects provided by the enhancements disclosed herein includes the concept of a pivot schema that supports the gesture-based control of pivot configurations. A pivot schema provides a map of the fields of a target data table that a pivot engine may reference when responding to gesture-based user input. The pivot schema enables the pivot engine to change pivot configurations without the user having to specify a particular field. This has the added effect of allowing the user to create and/or modify pivot tables in few steps than would otherwise occur via a standard configuration menu.

While the concepts disclosed herein are generally described with respect to pivot tables and tables in the context of spreadsheets, it may be appreciated that they apply to any type of pivot object and any environment. For example, the gesture-based configuration of pivot tables applies just as well to other types of pivot objects such as heat maps, charts, timelines, and graphs. In addition, the data tables disclosed herein may be sourced from a variety of contexts in addition to spreadsheets such as databases, documents, data streams, and the like. In addition, while the reductions disclosed herein generally relate to filtering and summarizing data, other reductions are possible and fall within concepts disclosed herein. For example, data may be averaged, visualized as a graph, reduced to a set of top-n items, and the like.

Figure 1A:
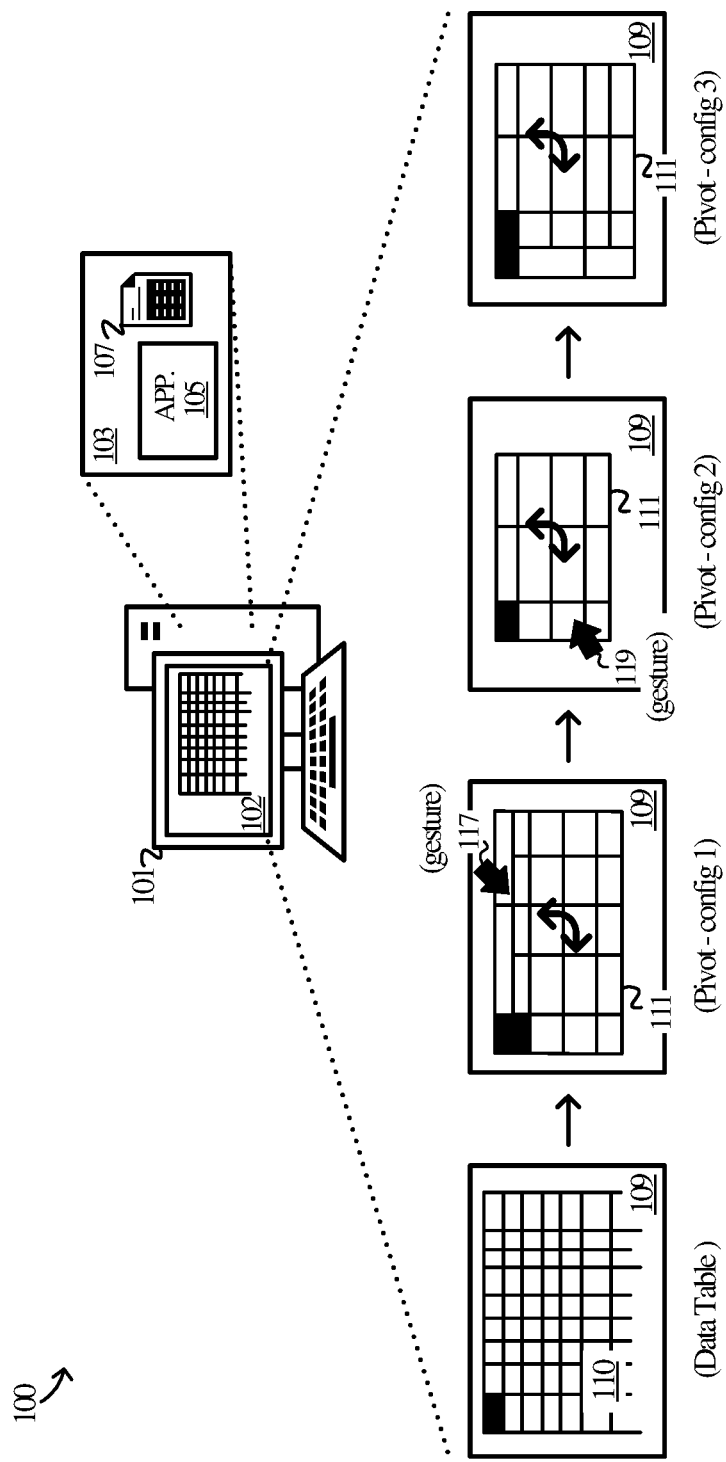
FIGS. 1A and 1B illustrate an operational environment and a software architecture respective, in an implementation enhanced pivot table experiences.

Referring now to the drawings, FIG. 1A illustrates an operational environment 100 in an implementation of enhanced pivot table interactions. Operational environment 100 includes computing device 101, which is representative of any end-user computing device capable of providing gesture-based pivot configurations as disclosed herein. Examples of computing device 101 include, but are not limited to, desktop computers, laptop computers, tablet computers, mobile phones and any other suitable computing devices, including server computers. While discussed herein primarily with respect to end-user devices, it may be appreciated that the features and functionality disclosed herein may be provided by a single device (e.g., a client computer) or by multiple devices operating in a cooperative fashion (e.g., a client-server approach).

Computing device 101 includes runtime environment 103, which provides a context for the execution of application 105 with respect to file 107. Runtime environment 103 is representative of any environment in which applications may run including local environments, native environments, browser-based environments, virtual environments, containerized environments, or the like.

Application 105 is representative of any software application capable of generating and configuring pivot tables as disclosed herein. Examples of application 105 include, but are not limited to, spreadsheet applications, database applications, business intelligence applications, and the like. Application 105 may be implemented in a stand-alone manner separately from other applications, as a plug-in or add-on to other applications, or in a distributed manner across multiple applications. Application may be a natively installed and executed applications, a browser-based "web" application, a mobile application, or any combination or variation thereof. File 107 is representative of any content that may include a data table, examples of which include spreadsheet workbooks and other productivity documents, databases, business intelligence data structures, data streams, and the like.

Briefly, application 105 opens file 107 and renders, displays, or causes to be displayed a view 109 of the file's contents on display 102 of computing device 101. Here, the content is assumed to include tabular data, represented by data table 110. A user operating computing device 101 interfaces with application 105 to create a pivot table 111, which provides a summary perspective of the data in data table 110. It is assumed for exemplary purposes that pivot table 111 has an initial configuration (config 1) configured autonomously by application 105, non-autonomously by the user, or in a semi-autonomous manner by both the application and the user.

It is further assumed for exemplary purposes that the user desires to change the configuration of pivot table 111. To do so, the user supplies gesture 117 with respect to a query area of pivot table 111. Gesture 117 is representative of any user input capable of indicating an intent of the user to change the configuration of the targeted query area of pivot table 111 such as a zoom or swipe gesture. While touch gestures are contemplated herein, other types of user input are also possible such as voice commands and mouse input.

Regardless of the input type, application 105 responds by changing the configuration of pivot table 111. As illustrated, the size and layout of pivot table 111 has changed relative to its initial configuration to represent visually that one or more of the query areas of the pivot table have been changed responsive to gesture 117.

Continuing with the brief example, the user supplies subsequent user input represented by gesture 119, again with respect to a query area of pivot table 111. Similar to gesture 117, gesture 119 indicates to application 105 an intent of the user to again change the configuration of a targeted query area of pivot table 111. Accordingly, application 105 reconfigures pivot table 111 to reflect the input supplied by gesture 119.

It may be appreciated that, from the initial configuration (config 1) through the second and third configurations (config 2 and config 3 respectively), various aspects of pivot table 111 changed in response to gesture 117 and gesture 119. In the first change from config 1 to config 2, gesture 117 targeted a columns area of pivot table 111, causing the columns area to be reduced automatically from two layers to a single layer. In the second change, gesture 119 targeted a rows area of pivot table 111, causing the rows area to expand from a single dimension to two dimensions automatically.

Figure 1B:
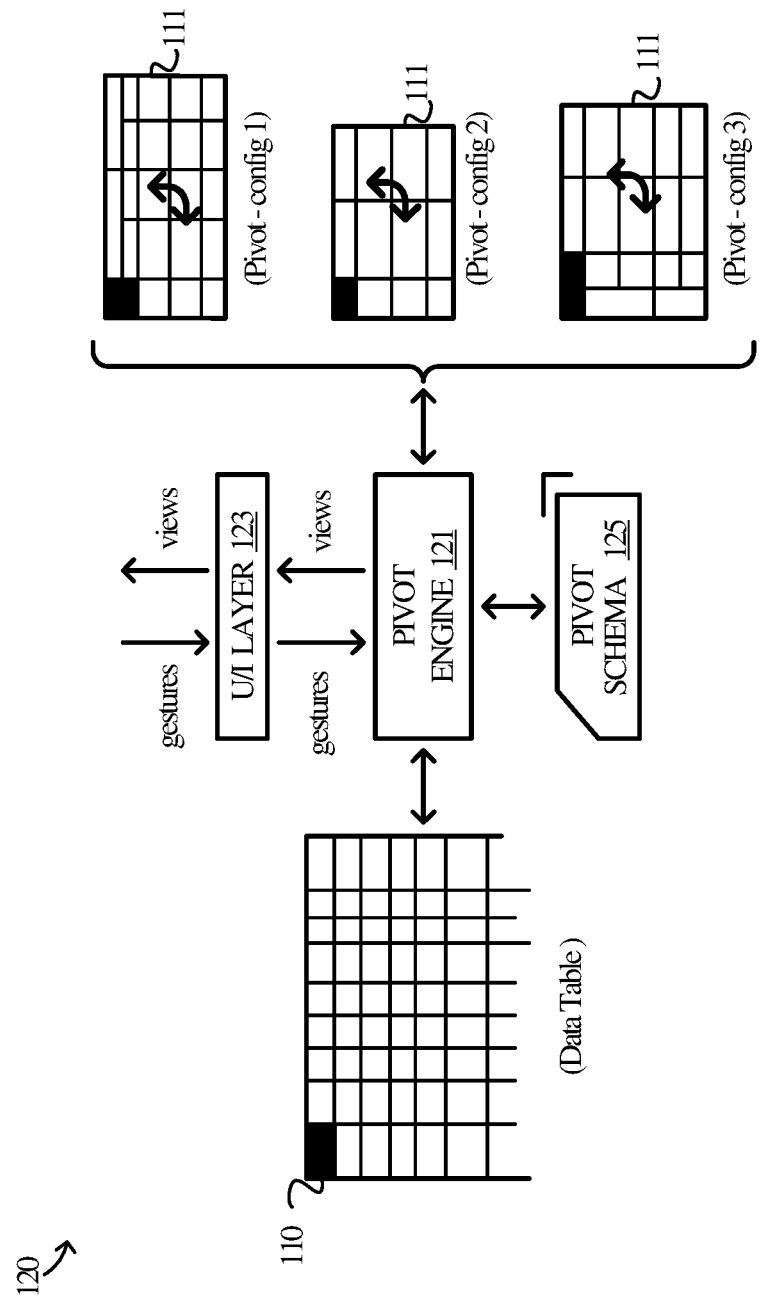

FIG. 1B illustrates a software architecture 120 employed by application 105 to provide the features and functionally described briefly above. Software architecture 120 includes pivot engine 121, user interface layer 123, and pivot schema 125. Pivot engine 121 is representative of one or more software components, modules, or other such portions of a software application (e.g., application 105) capable of configuring and generating a pivot table.

User interface layer 123 is similarly representative of one or more software components, modules, or other such portions of a software application (e.g., application 105) capable of providing user input to pivot engine 121 and receiving pivot table updates produced by pivot engine 121. User interface layer 123 interfaces between pivot engine 121 and elements of runtime environment 103 more generally. For example, user interface layer 123 may receive gesture information from an operating system component and provides an indication of the gestures to pivot engine 121. User interface layer 123 may also receive pivot table views from pivot engine 121, which it provides to an upstream component of runtime environment 103 to be displayed by computing device 101.

Pivot schema 125 is representative of a table, list, or other such data structure generated and maintained by pivot engine 121 to guide the gesture-driven configuration techniques disclosed herein. Pivot engine 121 constructs pivot schema 125 from the fields of data table 110 at runtime and uses pivot schema 125 to determine how to configure (or reconfigure) a pivot table based on gestures. In some scenarios, pivot engine 121 may generate and/or enhance pivot schema 125 based on other information about data types that may be built-in to the runtime environment, downloaded from an external source, or provided by user input. For instance, the information may identify existing/known relationships between cities and states, months and years, and the like. In the brief example illustrated above with respect to FIG. 1A—and largely reproduced in FIG. 1B—pivot table 111 transitions through three different configurations in response to gesture-based user input, all of which is driven by pivot engine 121 consulting pivot schema 125.

Figure 2:
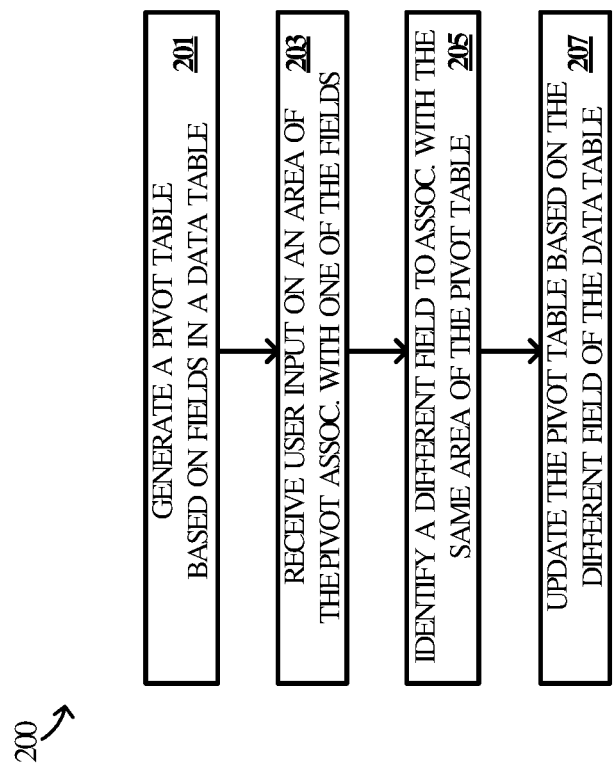
FIG. 2 illustrates a pivot configuration process in an implementation.

FIG. 2 illustrates a pivot configuration process 200 employed by pivot engine 121 to configure pivot tables dynamically based on gestures. Pivot configuration process 200 is implemented in program instructions in the context of pivot engine 121 specifically, and application 105 more generally. When executed by one or more processors of a suitable computing device (e.g., computing device 101), the program instructions direct the computing device to operate as follows, referring parenthetically to the steps in FIG. 2.

In operation, pivot engine 121 generates a pivot table based on one or more fields of a data table (step 201). The pivot table may then be displayed on a display of the computing device such that a user can subsequently supply gesture-based input to configure or reconfigure the pivot table.

Generating the pivot table may include, for example, identifying one or more fields of the data table from which to draw query generators, assigning the query generators to the columns area and rows area of the pivot table, and filtering the table based on the resulting queries. A values area of the pivot table may be populated with a sum or count of the filtered data resulting from the queries. In some cases, the pivot table is rendered in the same context as the source data table such as a worksheet of a spreadsheet workbook. In other cases, the pivot table may be rendered in a different context such as a different worksheet. In still other scenarios, the pivot table may be rendered in a non-tabular form such as a graph or heatmap.

Next, the pivot engine 121 receives user input via user interface layer 123. The user input is, for example, a gesture made with respect to a query area of the pivot table. For instance, the user may zoom-in on, zoom-out from, swipe-left on, or swipe-right on either one of the rows area of the pivot table or the columns area of the pivot table (step 203).

Pivot engine 121 proceeds to identify, based on the gesture, a different field of the data table to associate with the target query area of the pivot table (step 205). The different field may replace the field that was previously associated with the target query area, or it may supplement the current field, adding a dimension to the queries generated from the query area.

Lastly, pivot engine 121 updates the pivot table based on the new field that was identified based on the gesture (step 207). For example, the pivot table may be recalculated based on the new queries generated from the new field. While referred to herein as updating the current pivot table, it may be appreciated that an entirely new instance of the pivot table could be created each time the pivot configuration changes.

In some implementations, pivot configuration process 200 also directs the computing device to generate a schema from fields in the data table. To identify the different field based on the gesture, as referenced with respect to step 205, the computing device may identify a position of the field in the schema, identify an offset from the field based on the gesture, and identify the different field in the schema based on the offset.

In some examples, the data table has columns of data corresponding to the fields of the data table. As such, the computing device generates the pivot table based on criteria derived from the columns that correspond to the fields of the data table. Indeed, updating the pivot table may include updating the pivot table based on new or different criteria derived from a different one of columns that corresponds to the different fields. Examples of the criteria include unique values in the columns of data, as well as derived values (e.g., alphabetic buckets, numeric buckets, and geographic regions). As such, generating the pivot table based on the criteria may include filtering the data table based on the unique values and/or derived values, calculating results based on the data table as filtered, and populating the values area with the results. Similarly, the different criteria may be different unique values in a different one of the columns of data. As such, updating the pivot table based on the different criteria may include filtering the data table based at least on the different criteria, calculating the results based on the data table as filtered, and populating the values area with the results.

Figure 3:
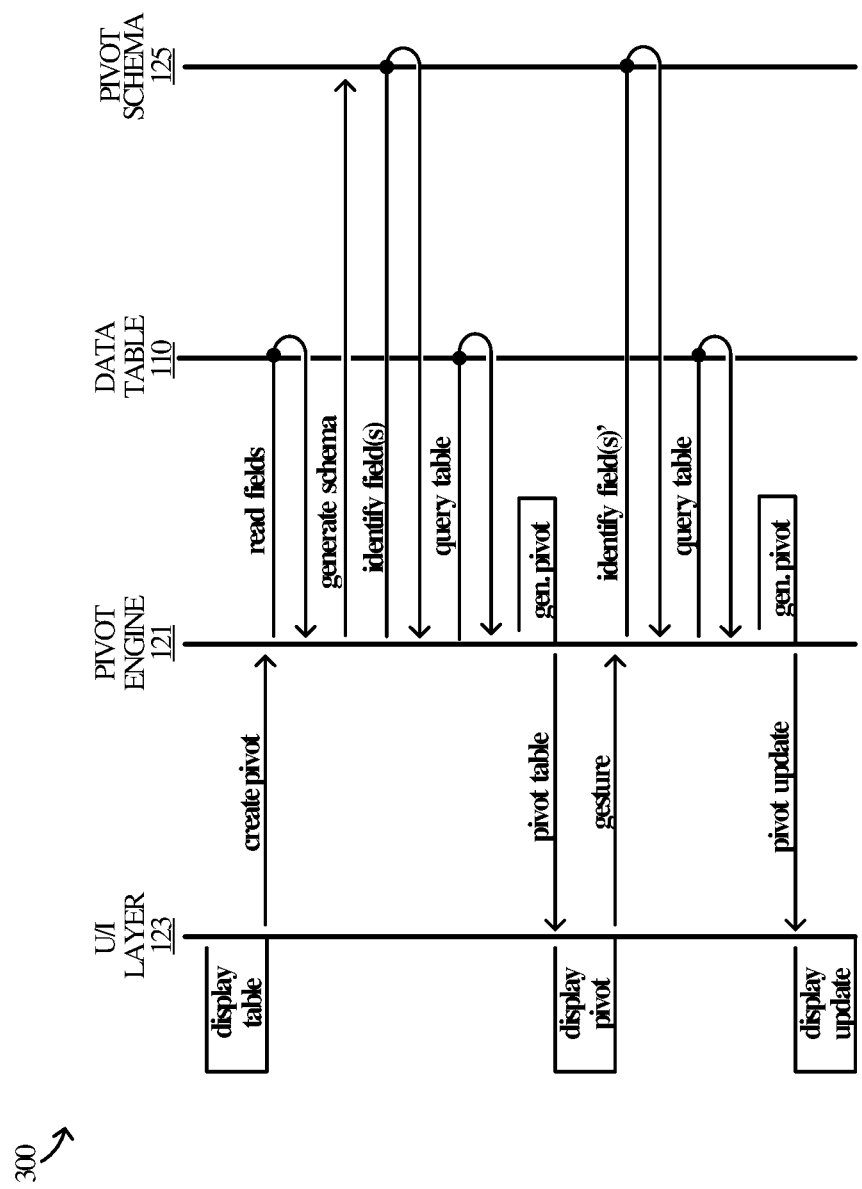
FIG. 3 illustrates an operational sequence in an implementation.

FIG. 3 illustrates an operational scenario 300 that is representative of an application of configuration process 200 by pivot engine 121. In operation, data table 110 has been generated and displayed via user interface layer 123. It is assumed for exemplary purposes that a user determines via user interface layer 123 to create a pivot table. Accordingly, user interface layer 123 calls or otherwise passes a command to pivot engine 121 to create the pivot table.

Pivot engine 121 responsively reads the fields of data table 110 and generates pivot schema 125 from the fields. Pivot schema 125 is, for example, a list or table of the fields that includes meta data that implicitly or explicitly describes a hierarchy for the fields. That is, the meta data in pivot schema provides the fields in an order through which they can be cycled in and out of the pivot table, or otherwise associated and disassociated with the query areas of the pivot table.

Next, pivot engine 121 uses pivot schema 125 to identify an initial set of fields from data table 110 to associate with the query areas of the pivot table. Pivot engine 121 associates one or more of the fields with one or more of the columns area, rows area, and values area of the pivot table. The associations of fields with query areas provides query generators with which to query the data table. In particular, the associated fields tell pivot engine 121 which fields to search for unique values. The unique values serve as the labels for the columns and rows in the pivot table. The unique values also serve as the filter criteria when querying data table 110.

Pivot engine 121 then proceeds to query data table 110 using the column and row labels configured in the previous steps. For example, pivot engine 121 filters data table 110 based on the labels and then sums or counts the values in a field associated with the values area of the pivot table.

Pivot engine 121 generates the pivot table by performing the filtering and calculating for each cell of the pivot table, until all of the cells in the values area have been populated with results. The completed pivot table is provided to user interface layer 123 such that it can be displayed by computing device 101 more generally.

It is assumed for exemplary purposes that the user desires to change the configuration of the pivot table. Accordingly, the user supplies input via a touch gesture on the screen of computing device 101. User interface layer 123 provides an indication of the gesture to pivot engine 121, which responsively accesses pivot schema 125 to identify one or more new fields to incorporate into the pivot table. In particular, pivot engine 121 determines an intent of the user from the gesture and, based on the intent, identifies a new field in the schema to incorporate into the pivot table. For example, if the gesture is a zoom-in gesture, then the intent is to add a dimension to a query area. In contrast, a zoom-out gesture indicates an intent to remove a dimension from a query area. In another example, a swipe-left or swipe-right gesture may indicate an intent to change the field associated with a query area.

With the associations reconfigured, pivot engine 121 queries data table 110 using the column and row labels configured in the previous steps. For example, pivot engine 121 filters data table 110 based on the labels and then sums or counts the values in a field associated with the values area of the pivot table. Here, at least one of the labels used to filter data table 110 will differ relative to the set of labels used previously, as a result of the user input. For example, one of the initial values may be replaced with a new value, or the new value may be additive with respect to the initial set of values.

Pivot engine 121 updates (or replaces) the pivot table by performing the filtering and calculating for each cell of the pivot table, until all of the cells in the values area have been populated with results. The updated pivot table is provided to user interface layer 123 such that it can be displayed by computing device 101.

Figure 4:
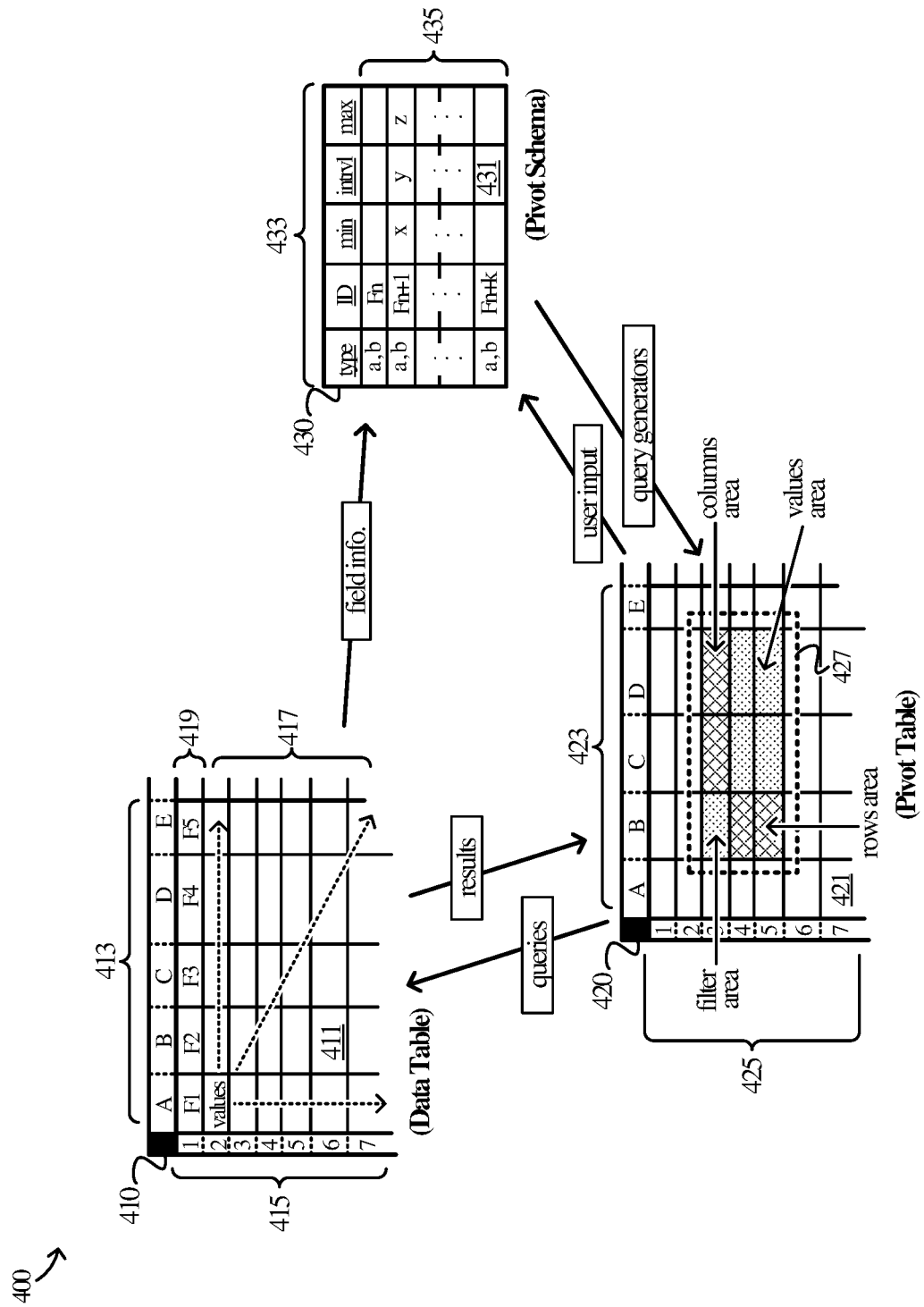
FIG. 4 illustrates a data architecture in an implementation.

FIG. 4 illustrates an object architecture 400 in another implementation. Object architecture 400 is representative of an architecture employed by application 105 in general, and pivot engine 121 more specifically, when providing the enhanced pivot capabilities disclosed herein. Object architecture 400 includes worksheet 410, schema object 430, and worksheet 420.

Worksheet 410 is representative of spreadsheet worksheet provided in the context of spreadsheet workbooks. Worksheet 410 includes a cell grid defined by columns 413 and rows 415. The cell grid includes a data table 411 in a subset of the cells. Data table 411 includes a first row (row 1) that includes a set of fields 419 in columns A-E of the cell grid. Data table 411 also includes a set of records 417 arranged in rows 2 and onward of the cell grid. The fields are represented by labels F1, F2, F3, F4, and F5 for exemplary purposes.

Worksheet 420 is also representative of a spreadsheet worksheet provided in the context of spreadsheet workbooks. Worksheet 420 includes a cell grid defined by columns 423 and rows 425. Within the cell grid reside pivot table 427. Pivot table 427 is representative of a pivot table created by pivot engine 121 based on data table 411 and schema object 430. Pivot table 427 includes various query areas represented by a columns area, a rows area, a values area, and a filter area (which is optional). The query areas are configured with values from data table 411 and based on schema object 430.

Schema object 430 is representative of any data structure suitable for storing meta data about data table 411 to allow pivot engine 121 to configure a pivot table generated from data table 411. Schema object 430 may be, for example, a table, a list, a graph, or the like. In this example, schema object 430 is a table defined by columns 433 and rows 435, referred to herein as schema table 431. The first row of schema table 431 includes various headers that describe characteristics of the fields in data table 411 such as a given column's data type, a field identifier (ID), and the nature of numeric values in the field, when relevant.

In operation, pivot engine 121 ingests data table 411 to discovers its fields and characteristics about the fields. Pivot engine 121 then populates schema table 431 in schema object 430 with the field information, such as the names (IDs) of each field, their locations in the data table relative to each other, their data types, and numeric information.

How the fields are arranged in schema table 431 governs how pivot engine 121 uses the schema to configure a pivot table. Initially, the fields may be arranged in the order in which they appear in data table 411. In this example, each field (Fn . . . n+k) is arranged vertically in the order in which the fields appear horizontally in the data table: Fn is followed by Fn+1, and so on until Fn+k. User input (gestures) made with respect to the query areas of pivot table 427 are used by pivot engine 121 to interrogate the fields in schema object 430. For example, a swipe-left gesture may indicate to pivot engine 121 that the user desires to return to a previous field with respect to a target query area. Accordingly, pivot engine 121 finds a position of the current field in schema table 431, identifies an offset based on the gesture, and identifies the next (or new) field based on the offset, such as by advancing up or down in the table by the offset amount.

Having identified the new field, pivot engine 121 reconfigures pivot table 427 based on the new field. For example, the current field associated with one the target query area may be replaced by or supplemented with the new field. Since the fields serve as query generators, changing the field-area associations causes new queries to be generated from pivot table 427, which changes the summary provided by the pivot table with respect to data table 411. This is because new queries made based on the new query generator (s) will return new results from data table 411, which will be summarized anew in the values area of pivot table 427.

FIGS. 5A-5H illustrate an operational scenario 500 that exemplifies the enhanced pivot table capabilities disclosed herein. In particular, operational scenario 500 illustrates how a user would interact via gestures made with respect to query areas of a pivot table, to change the configuration of the pivot table. Operational scenario begins with the construction of a pivot table from a data table and proceeds to illustrate gesture-based interactions with the pivot table to change its configuration. Operational scenario 500 contemplates the user of a pivot schema by a pivot engine to create a map of data table fields that may be leveraged by the engine to change a pivot table in response to user input.

Figure 5A:
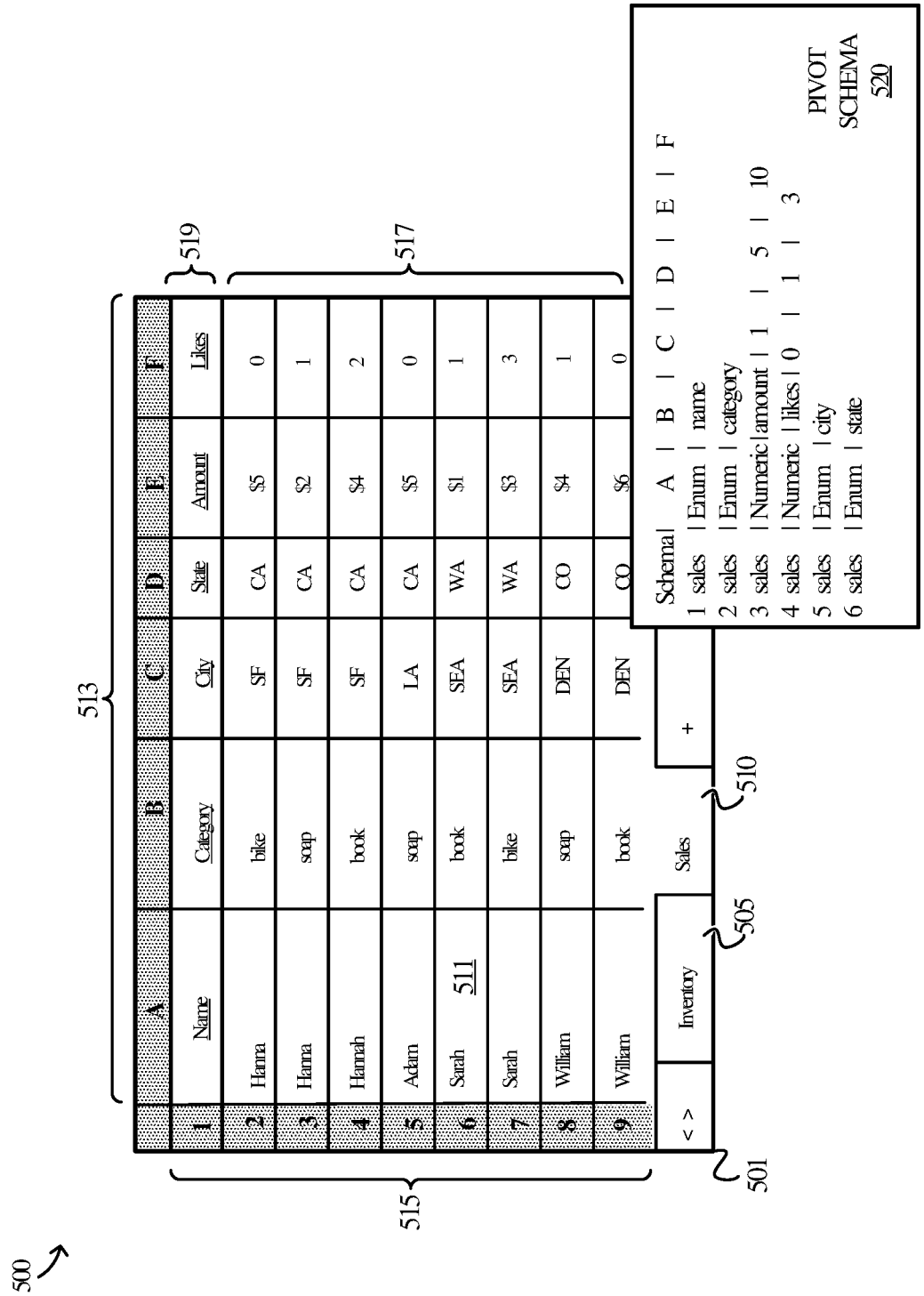
FIG. 5A-5I illustrate an operational scenario in an implementation.

Beginning with FIG. 5A, operational scenario 500 involves a data table 511 in a worksheet 510 ("Sales") of a spreadsheet workbook 501 displayed in a user interface to a spreadsheet application. The workbook also includes a second worksheet 505 ("Inventory"), both of which are accessible to a user by clicking on, touching, or otherwise selecting a tab labeled with the name of the worksheet.

Worksheet 510 includes a grid of cells defined by columns 513 (labeled A-F) and rows 515 (numbered 1-9). Data table 511 includes a set of records 517 in certain rows 2-9 of the worksheet. Fields 519 in row 1 of the worksheet define the components of each of the records. The records are populated with sales data in this example, including the Name of a salesperson, the Category of items sold, the City of a sale, the State of the sale, the Amount of the sale (in dollars), and the number of Likes associated with the sale.

Operational scenario 500 also involves pivot schema 520. Pivot schema 520 is representative of a schema object generated by pivot engine 121 to guide gesture-based configurations of pivot tables in the background of the spreadsheet application. That is, pivot schema 520 is not displayed in the user interface, but rather is a data structure accessed by pivot engine 121 in response to user input, and is shown in FIGS. 5A-5H for explanatory purposes.

Pivot schema 520 includes meta data arranged in a tabular form that describes aspects of data table 511 including its fields and characteristics of the fields. The table includes a header row with columns A-F. Each of the rows 1-6 in the table include information about a given one of the fields 519 in data table 511. For example, column B describes the name of each field (name, category, etc.), while column A describes the data type associated with each field (enum, numeric, etc.).

Columns C, D, and E describe characteristics of numeric data types including the minimum value of a numeric column-field, the maximum value a field, and a bucket size for counting purposes. For example, with respect to row 3 describing the Amount field, the minimum value is 1, the maximum value is 10, and the bucket size is 10. Similarly, for the Likes field, the minimum value is 0, the maximum value is 3, and the bucket size is 1.

Figure 5B:
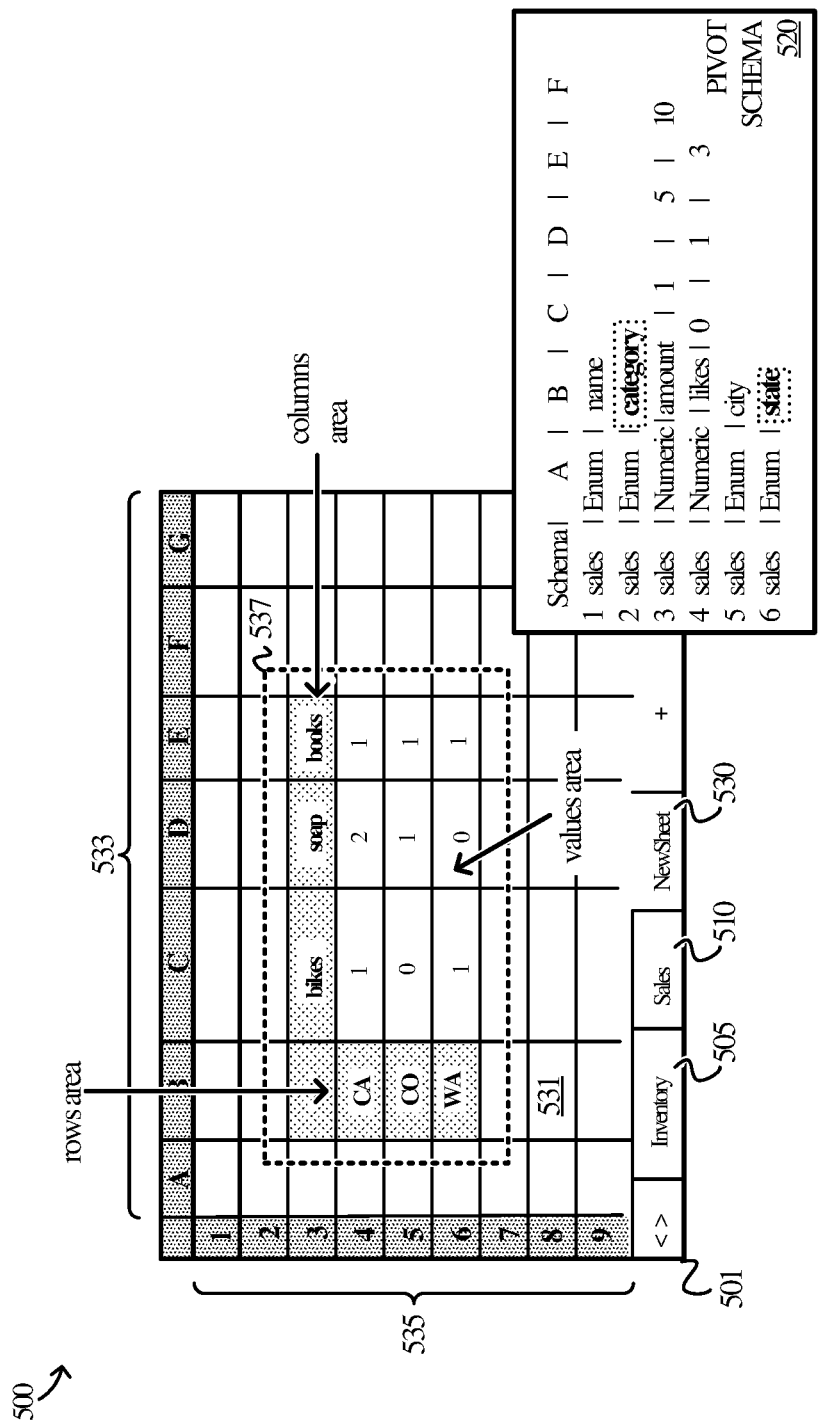

Turning to FIG. 5B, it is assumed for exemplary purposes that a user has taken action to create a pivot table 537, based on data table 511, via controls of the spreadsheet application. Pivot table 537 is rendered in a new worksheet of the workbook 501 (worksheet 530), although it could have been rendered in worksheet 510. Worksheet 530 includes columns 533 and rows 535 that form a cell grid 531. A subset of cells in the cell grid 531 are populated with pivot table 537.

Pivot table 537 includes a columns area, a rows area, and a values area. The columns area and rows area are populated with the query terms used to query data table 511. The values area is populated with the results of the query operations. The query terms in each of the query areas are drawn from the unique values of the columns in data table 511. The initial configuration may be selected by the user, determine autonomously by the application, or determined in a semi-autonomous manner. Regardless, the initial configuration of pivot table 537 includes an association of the Category field in data table 511 with the columns area of pivot table 537, and association of the State field of data table 511 with the rows area of pivot table 537. The values area of pivot table 537 is configured to hold a count of the items in data table 511 for each combination of Category values with State values.

More specifically, the columns area is populated with three (3) unique values from the Category field of data table 511: bikes, soap, and books. The rows area is also populated with three unique values from the State column of data table 511: CA, CO, and WA. Each cell in the values area is populated a count of items that match the criteria defined by the column and row of the cell. For instance, the upper most left cell in the values area holds a count the total number of bikes sold in California (1), while the lower right cell holds a count of the total number of books sold in Washington (1). The values are produced by pivot engine 121 filtering data table 511 based on the column and row criteria (category and state values) and then counting the number of records that satisfy the criteria.

Figure 5C:
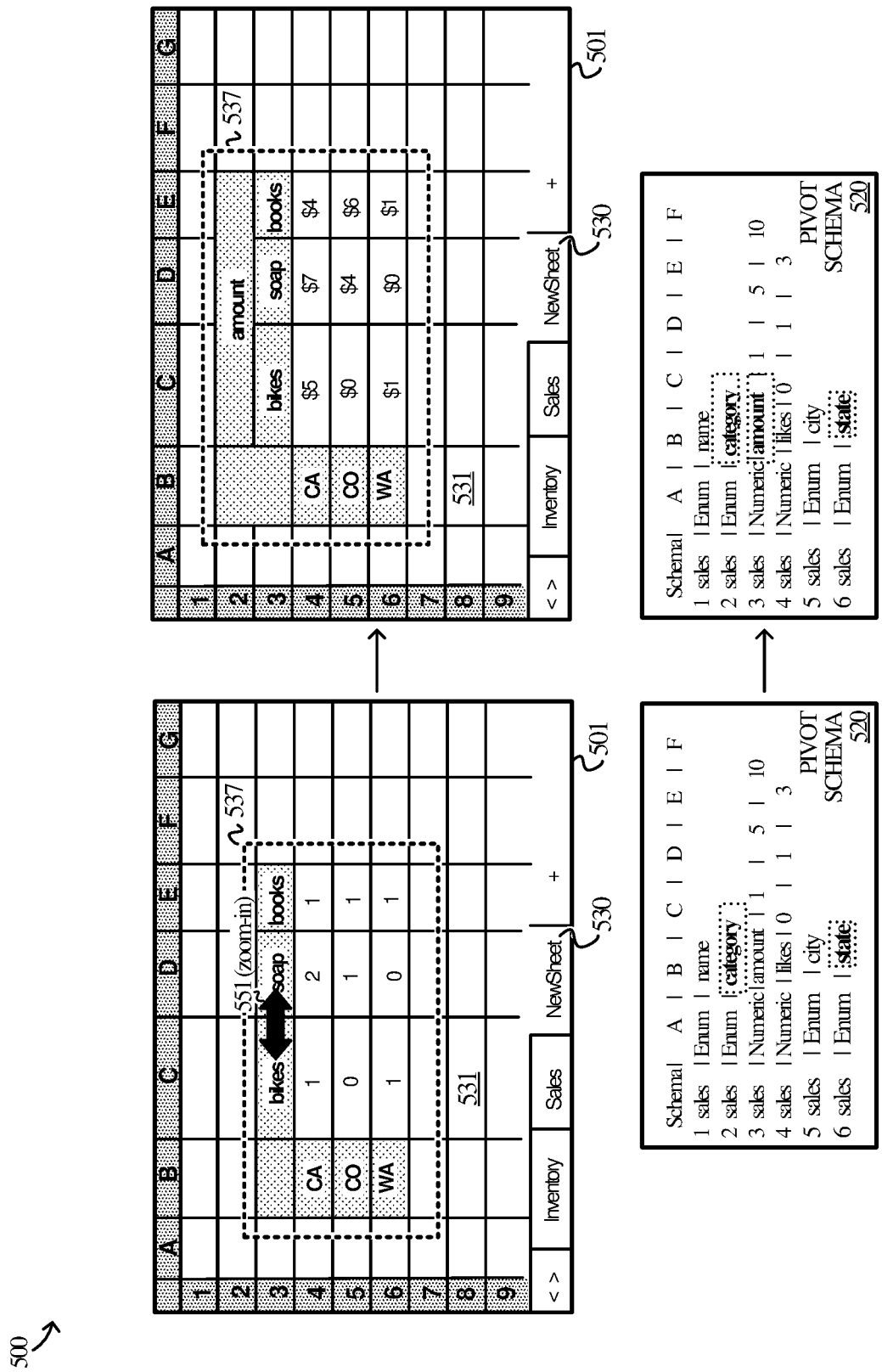
Figure 5D:
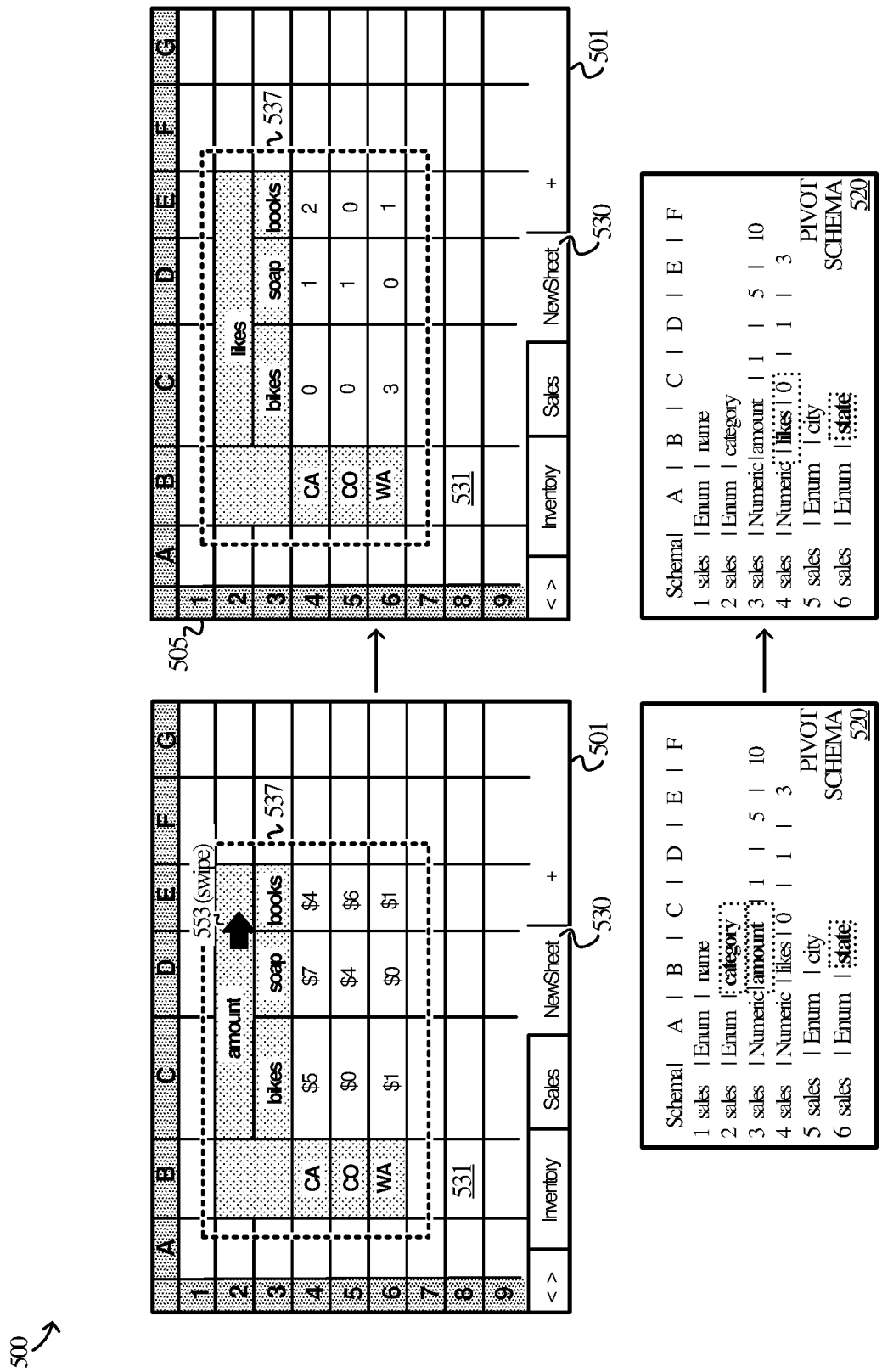

In FIG. 5C, it is assumed for exemplary purposes that the user desires to change the configuration of pivot table 537. Accordingly, the user supplies user input 551 on the columns area of pivot table 537 via the user interface, which is assumed here to be a touch-based zoom-in gesture. A zoom-in gesture may be, for example, a gesture made with two finger that spread apart through a duration of the gesture. The pivot engine interprets the gesture to indicate that the user desires to add a dimension to the columns area.

The pivot engine responds to the gesture by checking with pivot schema 520 to identify the position of the field currently associated with the columns area, which is the Category field. Next, the pivot engine identifies a field offset by one from the Category field, which here is the Amount field. Whether the pivot engine moves up or down in pivot schema 520 when identifying the field to provide the additional dimension is a design choice governed by developer choices.

Having identified the Amount field, pivot engine adds the Amount field to the columns area of pivot table 537 and recalculates the results of the pivot table. Pivot table 537 is expanded in the grid to encompass an additional row that holds the amount label. In addition, the cells in the values area are updated to reflect the results of the new queries generated based on the state values in the rows area, as well as the category values and the amount values in the columns area. That is, the values are produced by the pivot engine by filtering data table 511 based on the state criteria and the category criteria, but then summing the dollar amounts for each combination.

For example, the upper left cell in the values area includes the total dollar value of bikes sold in California. Likewise, the lower right cell in the values area includes the total dollar value of books sold in Washington.

As mentioned, how the pivot engine determined the offset in response to the zoom-in gesture was a matter of design choice. Here, the pivot engine landed on the Amount category. However, the user may desire to use a different query generator in place of the Amount category. Accordingly, in FIG. 5D, the user supplies user input 553 via the user interface, which is a swipe-right gesture. The swipe-right gesture indicates to the pivot engine that the user desires to change-out the Amount field for a next field in the schema.

The pivot engine proceeds to identify the next field down (although it could be designed to pick the next field up in the schema), which is the Likes field. The pivot engine delinks the Amount field from the columns area and links the Likes field to the columns area. The pivot engine then recalculates the results of pivot table 537 to show a sum of the number of likes for each category on a per-state basis. For example, the upper left cell in the values area includes the total number of "likes" for bikes sold in California, while the lower right cell in the values area shows the total number of likes for books sold in Washington.

Figure 5E:
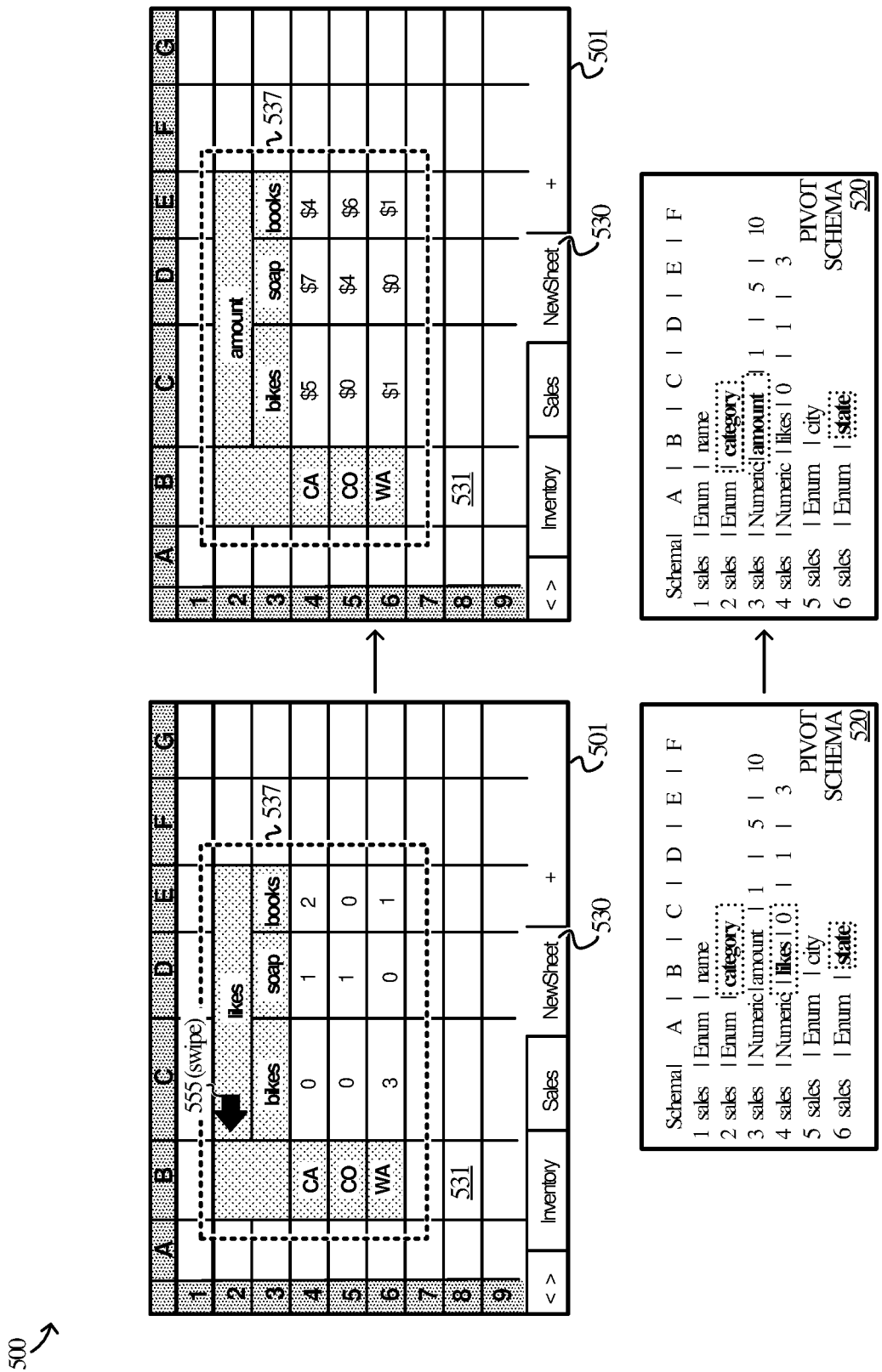

In FIG. 5E, the user determines to revert to the previous configuration by supplying a swipe-left gesture via user input 555. The pivot engine responds to the swipe-left gesture by moving up in pivot schema 520 to the Amount field. Accordingly, the pivot engine reconfigures the columns area to be linked to the Amount field rather than the likes field. The pivot engine also recalculates the result of the pivot table: the upper left cell in the values area again holds the total dollar value of bikes sold in California, while the lower right cell in the values area holds the total dollar value of books sold in Washington.

Figure 5F:
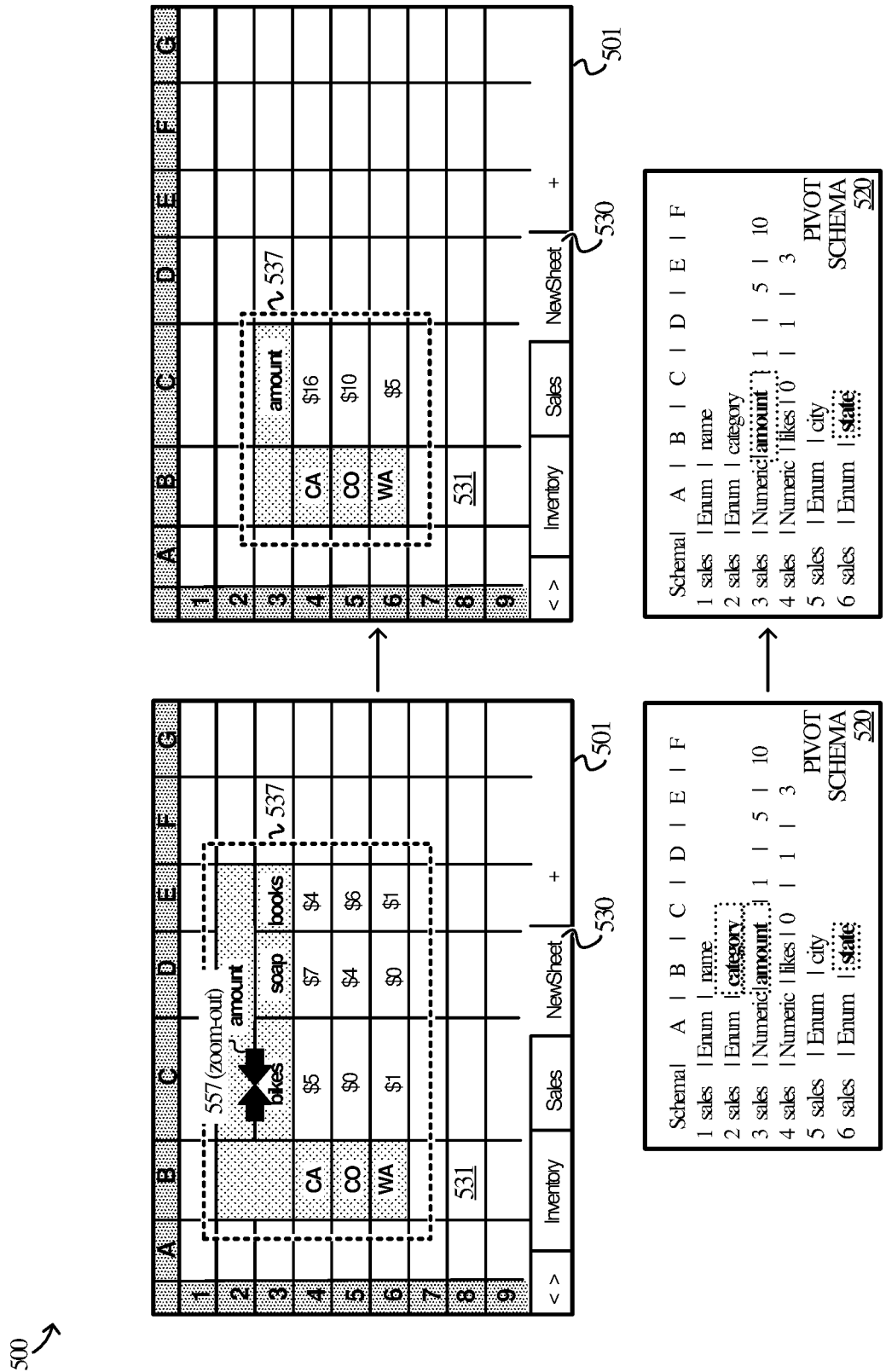

In FIG. 5F, the user decides to reduce the number of filters applied to the columns area of pivot table 537 by supplying a zoom-out gesture via user input 557. The zoom-out gesture is interpreted by the pivot engine as a desire to reduce the number of filters. Accordingly, the pivot gesture delinks the Category field from the columns area. Which field to delink from the columns area is also a matter of design choice. Rather than delinking the Category field, the pivot engine could have delinked the Amounts field instead.

As a result of the zoom-out gesture, the Amounts field is linked to the columns area, while the State field remains linked to the rows area. The pivot engine recalculates the pivot table, resulting in the values area being populated with the total dollar amount of items sold in each state. For example, sixteen dollars of goods were sold in California, ten dollars of goods were sold in Colorado, and five dollars of goods were sold in Washington.

Figure 5G:
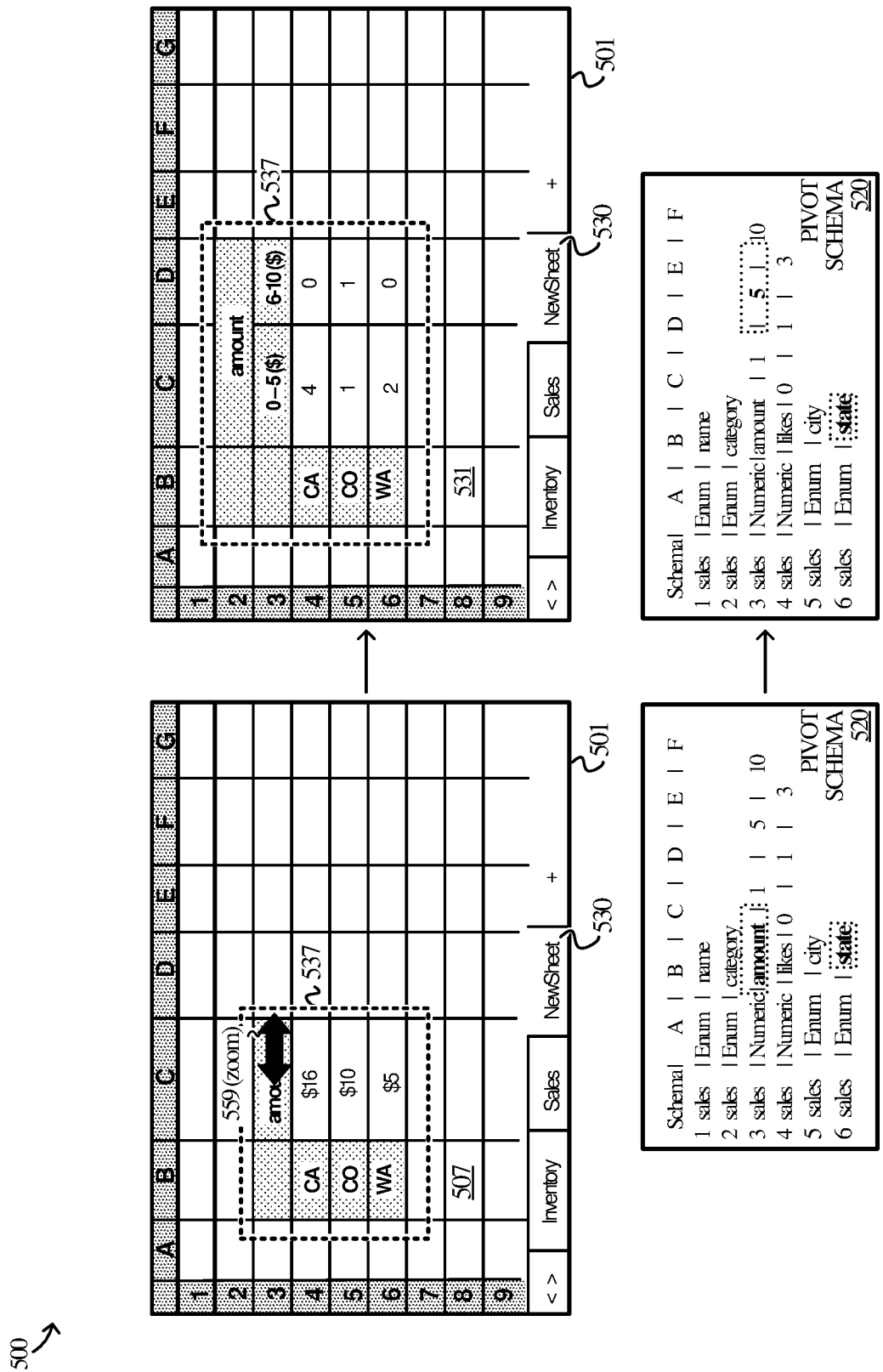

FIG. 5G illustrates a next step by the user to break-out the transactions in five-dollar increments. The user does so by suppling a zoom-in gesture via user input 559. The zoom-in gesture is interpreted by the pivot engine that the user wants to bucketize the amount values. The pivot engine consults pivot schema 520 to identify the buck size and incorporates the bucket size into its query criteria.

The pivot engine then recalculates new values based on the new criteria which include the State values, and the Amount values, but also the bucket size. Thus, the pivot engine counts the number of transactions within each bucket size on a per-state basis. For example, California had four (4) transactions of five dollars or less, and none greater than five dollars. Colorado had one transaction for each bucket, while Washington had two transactions of five dollars or less and none greater than five dollars.

Figure 5H:
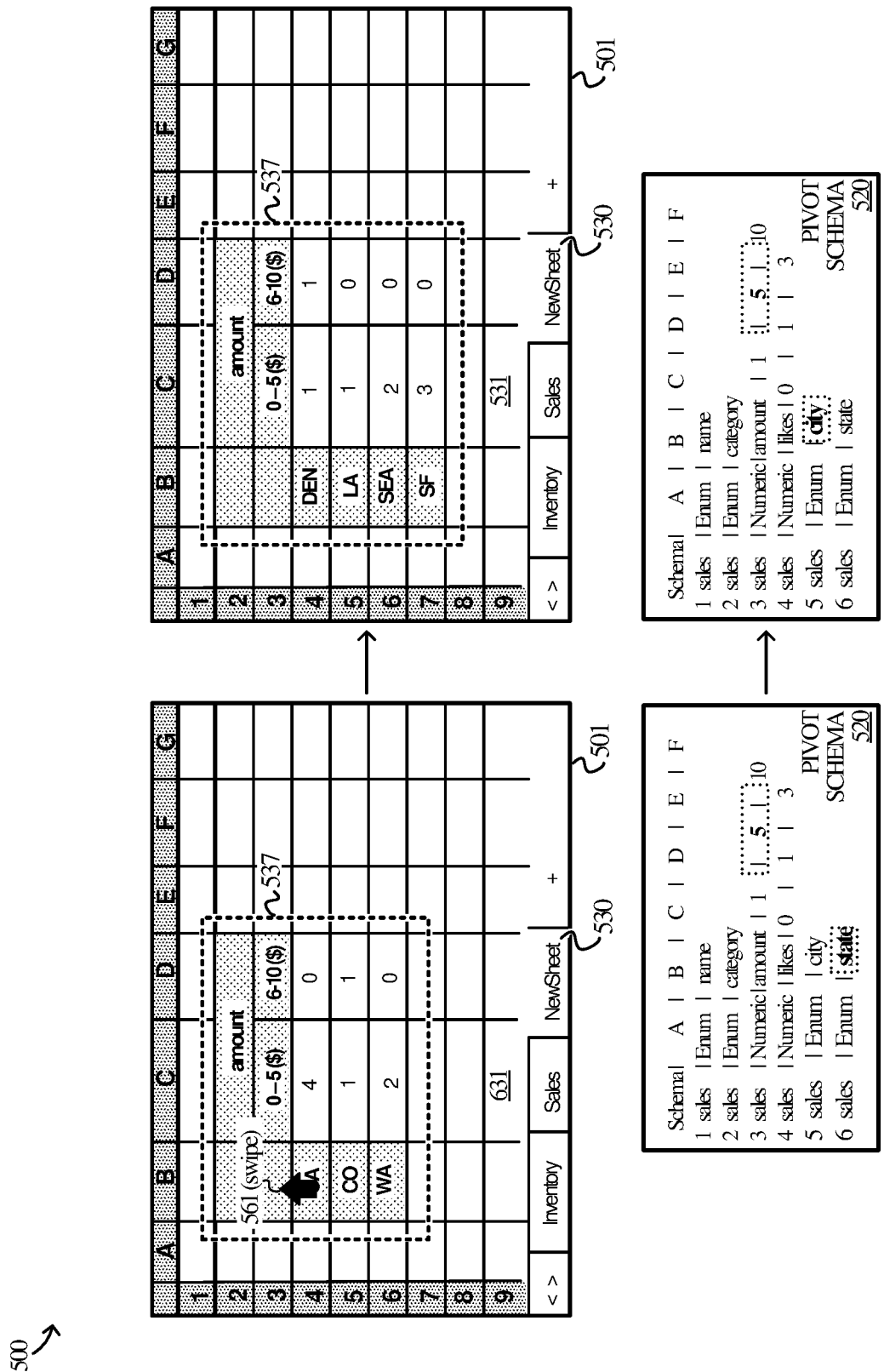

While FIG. 5A-5G illustrates gestures made with respect to the columns area of pivot table 537, it may be appreciated that gestures could also be made on the rows area, values area, or filter area (where applicable) if so desired, and the pivot engine would respond in a similar manner as shown with respect to the columns area. FIG. 5H illustrates one such example where the user supplies a swipe-up gesture via user input 561 on the rows area.

Here, the pivot engine interprets the swipe-up gesture to indicate that the user desires to change the criteria in the rows area from the State field to a different field. The pivot engine looks-up the position of the current field in pivot schema 520 and identifies a different field offset from the current field, which is the City field. Accordingly, the pivot engine swaps-out the State field for the City field in the configuration of the rows area criteria. The pivot table also re-calculates the values in the grid, resulting in a bucketized count of transactions on a per-city basis.

For example, pivot table 537 now holds a count of transactions of five dollars or less for Denver (1), as well as a count of transactions greater than five dollars (also 1). Los Angeles had one transaction of five dollars or less, and none greater than five, and so on for the remaining cities in the table (Seattle and San Francisco).

Figure 5I:
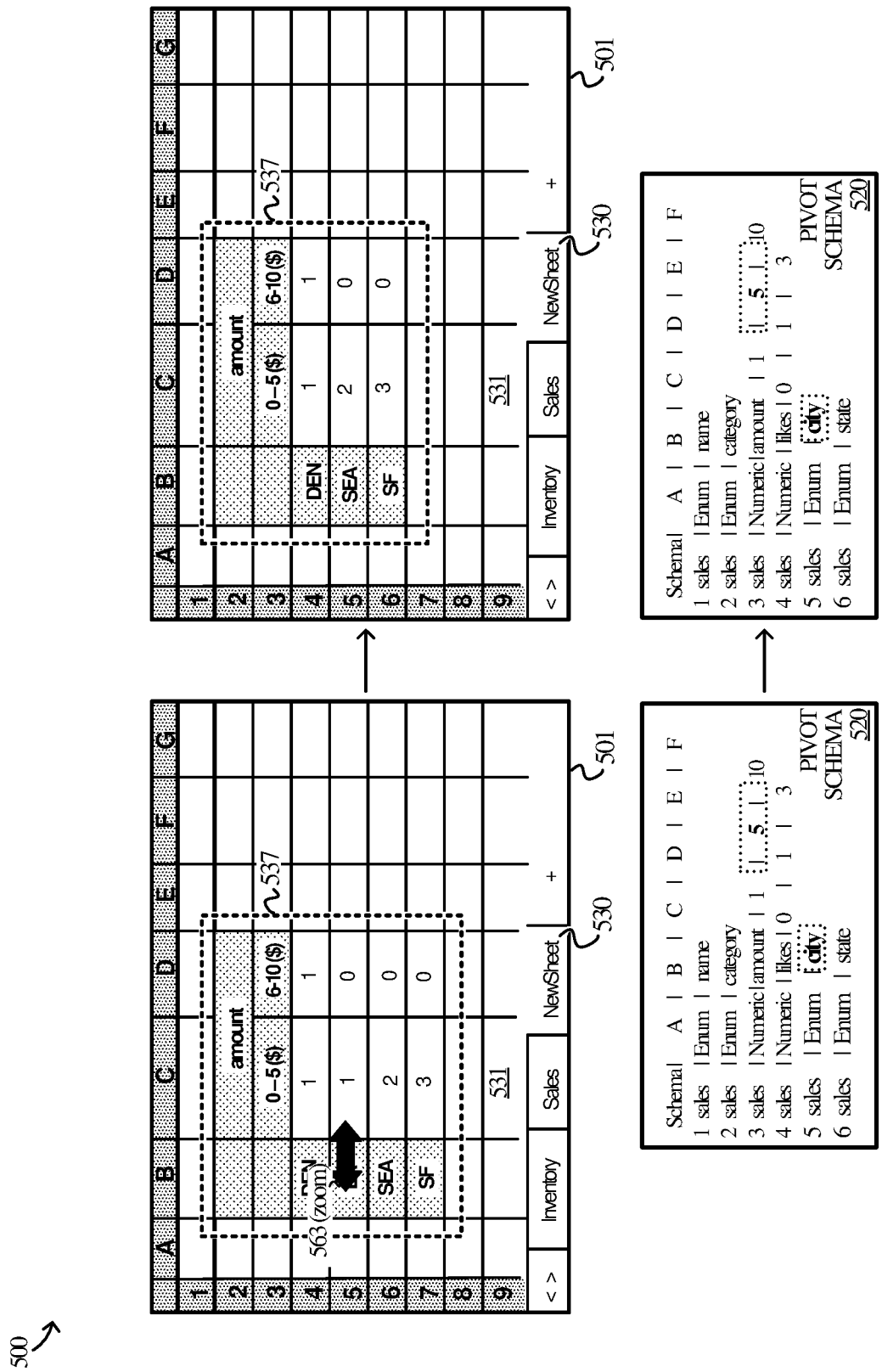

FIG. 5I illustrates a different example where a user supplies a zoom-in gesture via user input 563 on the rows area. Here, the pivot engine interprets the zoom-in gesture to indicate that the user desires to change the criteria in the rows area from the City field to the top-N values in the City field. Accordingly, the pivot engine filters the values from the City field to include only the top-3 cities in in the City field (Denver, Seattle, and San Francisco). The user could zoom-in again to drill down further to the top-2 cities, and so on. The user could then zoom-out to return to the top-3 cities or the full list of cities. The pivot table also re-calculates the values in the grid after each gesture, resulting in a bucketized count of transactions on a per-city basis for only the top-N cities in the list.

Figure 6:
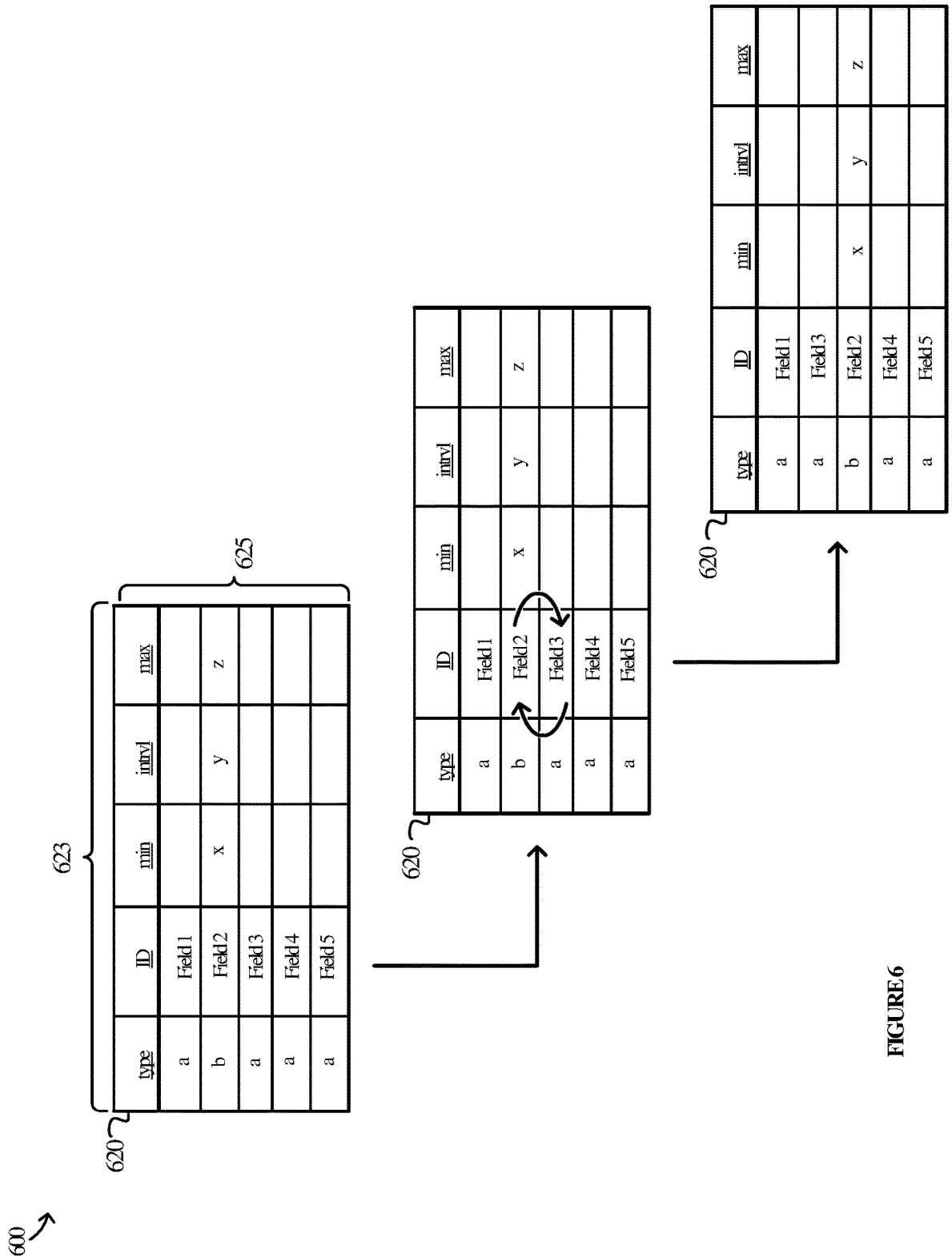
FIG. 6 illustrates a pivot schema and a related operational scenario in an implementation.

As mentioned, pivot schema 520 may be maintained by the pivot engine or other elements of a spreadsheet application in the background, invisible to the user. However, in some implementations the pivot schema may itself be configurable by the user. That is, the user could tailor the pivot schema to accord with navigational preferences of the user. FIG. 6 illustrates one brief operational scenario 600 in this regard.

Operational scenario 600 involves pivot schema 620, which is representative of a schema generated based on the fields of a data table. Pivot schema 620 includes column headers 623 for the type of fields in the table, field names, minimum values, maximum values, and intervals (or bucket sizes). The rows 625 of the schema are populated with the actual field names drawn from the subject data table. For instance, the named field in the schema holds the names of the fields in the data table. A pivot engine generates a pivot table based partly on the arrangement and order of the fields in pivot schema 620. In addition, the pivot engine relies upon the arrangement of fields in the schema when determining how to respond to gesture inputs.

In operation, a user may desire to change the navigational order of the fields to influence how the pivot engine responds to gesture input. To do so, the user may enter into a configuration menu of the pivot table that exposes the details of pivot schema 620. In the menu, the user can rearrange, move, add, or delete fields in the schema. In this example, the user re-orders the fields so that Field 3 follows Field 2, thereby influencing how the pivot engine will respond to gesture input.

For example, prior to making the change, the pivot engine would have cycled through the fields in order from Field 1 to Field 2, to Field 3, and so on through Field 5, in response to swipe-right gesture. Subsequent to the user-driven change, the pivot engine will cycle through from Field 1 to Field 3 (instead of Field 2), and then to Field 2, and so on through Field 5.

Figure 7:
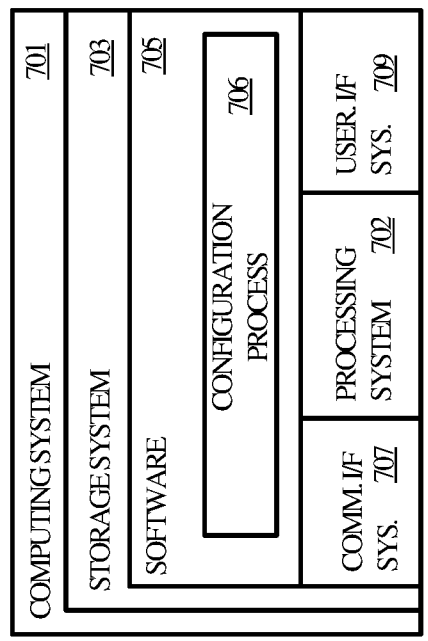
FIG. 7 illustrates a computing system suitable for implementing the various operational environments, architectures, processes, scenarios, and sequences discussed below with respect to the other Figures.

FIG. 7 illustrates computing device 701 that is representative of any system or collection of systems in which the various applications, processes, services, and scenarios disclosed herein may be implemented. Examples of computing device 701 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 701 may be implemented as a single apparatus, system, or device or may be implemented in a distributed manner as multiple apparatuses, systems, or devices. Computing device 701 includes, but is not limited to, processing system 702, storage system 703, software 705, communication interface system 707, and user interface system 709. Processing system 702 is operatively coupled with storage system 703, communication interface system 707, and user interface system 709.

Processing system 702 loads and executes software 705 from storage system 703. Software 705 includes and implements configuration process 706, which is representative of the processes discussed with respect to the preceding Figures, such as configuration process 200. When executed by processing system 702, software 705 directs processing system 702 to operate as described herein for at least the various processes, operational scenarios, and sequences discussed in the foregoing implementations. Computing device 701 may optionally include additional devices, features, or functionality not discussed for purposes of brevity.

Referring still to FIG. 7, processing system 702 may include a micro-processor and other circuitry that retrieves and executes software 705 from storage system 703. Processing system 702 may be implemented within a single processing device but may also be distributed across multiple processing devices or sub-systems that cooperate in executing program instructions. Examples of processing system 702 include general purpose central processing units, graphical processing units, application specific processors, integrated circuits, application specific integrated circuits, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 (including configuration process 706) may be implemented in program instructions and among other functions may, when executed by processing system 702, direct processing system 702 to operate as described with respect to the various operational scenarios, sequences, and processes illustrated herein. For example, software 705 may include program instructions for implementing gesture-based configuration of pivot tables as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtualization software, or other application software. Software 705 may also comprise firmware or some other form of machine-readable processing instructions executable by processing system 702.

In general, software 705, when loaded into processing system 702 and executed, transforms a suitable apparatus, system, or device (of which computing device 701 is representative) overall from a general-purpose computing system into a special-purpose computing system customized to support spreadsheet integrations with external environments and resources. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

Various technical effects may be appreciated from the foregoing discussion. In one, few manual steps are needed for a user to make changes to a pivot table. Rather than entering and editing a configuration menu, a user need only gesture with respect to a query area of a pivot table to change the query generators for that area. In addition, the gesture-based control disclosed herein allows a user to modify a pivot table with ease on smaller form factor devices that have less screen space such as a mobile phone or tablet where displaying and interacting with a configuration menu is difficult. Lastly, the gesture-based tools disclosed herein allow a user to quickly and easily explore different pivot table configurations by simply swiping or zooming in/out with respect to the pivot table, rather than having to enter into a menu and make the changes manually.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

It may be appreciated that, while the inventive concepts disclosed herein are discussed in the context of such productivity applications, they apply as well to other contexts such as gaming applications, virtual and augmented reality applications, business applications, and other types of software applications. Likewise, the concepts apply not just to electronic documents, but to other types of content such as in-game electronic content, virtual and augmented content, databases, and audio and video content.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:
   one or more computer readable storage media;
   one or more processors operatively coupled with the one or more computer readable storage media; and
   program instructions stored on the one or more computer readable storage media that, when executed by the one or more processors, direct the computing apparatus to at least:
   generate a schema comprising a map of one or more fields in a data table to query areas of a pivot table;
   identify a query definition for the pivot table, wherein the pivot table comprises the query areas and a values area and wherein the query definition indicates an association between a query area of the query areas of the pivot table and a field of the one or more fields in the data table;
   populate the values area of the pivot table based on the query definition;
   receive user input comprising a gesture made on a portion of a user interface displaying the pivot table, wherein the portion includes the query area of the pivot table associated with the field;
   identify, based on the gesture, an offset with respect to the schema of the data table;
   identify, based on the offset, a new association between a different field of the one or more fields in the data table and the query area of the pivot table, wherein to identify the new association, the program instructions direct the computing apparatus to identify a position of the field in the schema and identify the different field in the schema based on the offset;
   update the query definition based on the new association; and
   update the values area of the pivot table based on the updated query definition.

2. The computing apparatus of claim 1 wherein the schema comprises metadata describing relative locations of the one or more fields in the data table.

3. The computing apparatus of claim 2 wherein the relative locations of the one or more fields comprise an order through which the one or more fields are associated with the query area of the pivot table.

4. The computing apparatus of claim 1 wherein the pivot table comprises multiple query areas including a columns area, a rows area, and the values area, and wherein the gesture comprises one of a pinch gesture, a zoom-in, a zoom-out gesture, and a swipe gesture made on either the columns area or the rows area.

5. The computing apparatus of claim 4 wherein the data table comprises columns of data corresponding to the one or more fields of the data table, and wherein, to populate the values area of the pivot table based on the query definition, the program instructions direct the computing apparatus to populate the values area of the pivot table based on criteria derived from one or more of the columns that correspond to the one or more fields of the data table.

6. The computing apparatus of claim 5 wherein, to update the values area of the pivot table based on the updated query definition, the program instructions direct the computing apparatus to update the values area of the pivot table based at least on different criteria derived from a different one of columns that corresponds to the different field.

7. The computing apparatus of claim 6 wherein the criteria comprise unique values in the one or more columns of data, and wherein, to populate the values area of the pivot table based on the criteria, the program instructions direct the computing apparatus to:
   filter the data table based on the unique values;
   calculate results based on the data table as filtered; and
   populate the values area with the results.

8. The computing apparatus of claim 7 wherein the different criteria comprise different unique values in the different one of the columns of data, and wherein, to update the values area of the pivot table based on the different criteria, the program instructions direct the computing apparatus to:
   filter the data table based at least on the different criteria;
   calculate the results based on the data table as filtered; and
   populate the values area with the results.

9. The computing apparatus of claim 1 wherein to update the query definition based on the new association, the program instructions direct the computing apparatus to replace the field with the different field in the query definition.

10. One or more computer readable storage media having program instructions stored thereon, wherein the program instructions, when executed by one or more processors of a computing device, direct the computing device to at least:
generate a schema comprising a map of one or more fields in a data table to query areas of a pivot table;
identify a query definition for the pivot table, wherein the pivot table comprises the query areas and a values area and wherein the query definition indicates an association between a query area of the query areas of the pivot table with a field of the one or more fields in the data table;
populate the values area of the pivot table based on the query definition;
receive user input comprising a gesture made on a portion of a user interface displaying the pivot table, wherein the portion includes the query area of the pivot table associated with the field;
identify, based on the gesture, an offset with respect to the schema of the data table;
identify, based on the offset, a new association between a different field of the one or more fields in the data table and the query area of the pivot table, wherein to identify the new association, the program instructions direct the computing device to identify a position of the field in the schema and identify the different field in the schema based on the offset;
update the query definition based on the new association; and
update the values area of the pivot table based on the updated query definition.

11. A method comprising:
generating a schema comprising a map of one or more fields in a data table to query areas of a pivot table;
identifying a query definition for the pivot table, wherein the pivot table comprises the query areas and a values area and wherein the query definition indicates an association between a query area of the query areas of the pivot table and a field of the one or more fields in the data table;
populating the values area of the pivot table based on the query definition;
receiving user input comprising a gesture made on a portion of a user interface displaying the pivot table, wherein the portion includes the query area of the pivot table associated with the field;
identifying, based on the gesture, an offset with respect to the schema of the data table;
identifying, based on the offset, a new association between a different field of the one or more fields in the data table and the query area of the pivot table, wherein identifying the new association comprises identifying a position of the field in the schema and identifying the different field in the schema based on the offset;
updating the query definition based on the new association; and
updating the values area of the pivot table based on the updated query definition.

12. The method of claim 11 wherein the schema comprises metadata describing relative locations of the one or more fields in the data table.

13. The method of claim 12 wherein the relative locations of the one or more fields comprise an order through which the one or more fields are associated with the query area of the pivot table.

14. The method of claim 11 wherein the pivot table comprises multiple query areas including a columns area, a rows area, and the values area.

15. The method of claim 14 wherein the gesture comprises one of a pinch gesture, a zoom-in, a zoom-out gesture, and a swipe gesture made on either the columns area or the rows area.

16. The method of claim 14 wherein the data table comprises columns of data corresponding to the one or more fields of the data table, and wherein populating the values area of the pivot table based on the query definition comprises populating the values area of the pivot table based on criteria derived from one or more of the columns that correspond to the one or more fields of the data table.

17. The method of claim 16 wherein updating the values area of the pivot table based on the updated query definition comprises updating the values area of the pivot table based at least on different criteria derived from a different one of columns that corresponds to the different field.

18. The method of claim 17 wherein the criteria comprise unique values in the one or more columns of data, and wherein populating the values area of the pivot table based on the criteria comprises:
filtering the data table based on the unique values;
calculating results based on the data table as filtered; and
populating the values area with the results.

19. The method of claim 18 wherein the different criteria comprise different unique values in the different one of the columns of data, and wherein updating the pivot table based on the different criteria comprises:
filtering the data table based at least on the different criteria;
calculating the results based on the data table as filtered; and
populating the values area with the results.

20. The method of claim 11 wherein updating the query definition based on the new association comprises replacing the field with the different field in the query definition.

* * * * *